US010574276B2

(12) United States Patent
Yoo et al.

(10) Patent No.: US 10,574,276 B2
(45) Date of Patent: Feb. 25, 2020

(54) SELECTING A PRECODING CONFIGURATION BASED ON SELF-JAMMING METRICS

(71) Applicant: QUALCOMM Incorporated, San Diego, CA (US)

(72) Inventors: Taesang Yoo, San Diego, CA (US); Roberto Rimini, San Diego, CA (US); Richard Neil Braithwaite, Orange, CA (US); Jibing Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 636 days.

(21) Appl. No.: 14/470,822

(22) Filed: Aug. 27, 2014

(65) Prior Publication Data

US 2016/0065251 A1  Mar. 3, 2016

(51) Int. Cl.
*H04W 52/18* (2009.01)
*H04W 52/00* (2009.01)
*H04W 52/16* (2009.01)
*H04B 1/04* (2006.01)
*H04K 3/00* (2006.01)
*H04B 1/10* (2006.01)
*H04B 1/525* (2015.01)

(52) U.S. Cl.
CPC ............. *H04B 1/0475* (2013.01); *H04B 1/10* (2013.01); *H04B 1/525* (2013.01); *H04K 3/28* (2013.01); *H04K 2203/36* (2013.01)

(58) Field of Classification Search
CPC ..... H04W 52/16; H04W 52/38; H04W 52/18; H04W 16/14; H04W 52/00; Y02B 60/50; H04B 7/005
See application file for complete search history.

(56) References Cited

U.S. PATENT DOCUMENTS

| 7,733,813 B2* | 6/2010 | Shin ................... H04B 7/15585 370/278 |
| 8,311,485 B2* | 11/2012 | Dinh .................. G08B 13/2402 370/210 |
| 8,605,615 B2* | 12/2013 | Frank .................... H04W 24/04 370/252 |
| 8,725,067 B2* | 5/2014 | Ahn .................... H04B 7/15542 455/11.1 |
| 9,282,558 B2* | 3/2016 | Seo ....................... H04B 7/2656 |
| 9,602,230 B2* | 3/2017 | Roman .................. H04J 11/005 |
| 10,122,488 B2* | 11/2018 | Chung ................... H04H 20/38 |

(Continued)

OTHER PUBLICATIONS

International Search Report and Written Opinion—PCT/US2015/044213—ISA/EPO—dated Nov. 9, 2015.

*Primary Examiner* — Pablo N Tran
(74) *Attorney, Agent, or Firm* — Austin Rapp & Hardman, P.C.

(57) ABSTRACT

A method for wireless communication by a wireless communication device is described. The wireless communication device determines that an aggressor radio in the wireless communication device is causing (or can potentially cause) self-jamming to a victim radio in the wireless communication device. A precoding configuration is selected based on one or more link throughput metrics and one or more self-jamming metrics. The precoding configuration is applied to transmissions of the aggressor radio.

30 Claims, 6 Drawing Sheets

(56) References Cited

U.S. PATENT DOCUMENTS

| | | |
|---|---|---|
| 2003/0031279 A1* | 2/2003 | Blount .................. H04B 1/525 |
| | | 375/346 |
| 2003/0104787 A1* | 6/2003 | Blount .................. H04B 1/525 |
| | | 455/67.13 |
| 2003/0185285 A1* | 10/2003 | Talwar ................ H04B 7/0842 |
| | | 375/148 |
| 2004/0142700 A1 | 7/2004 | Marinier |
| 2009/0040937 A1* | 2/2009 | Xhafa ................ H04L 41/5003 |
| | | 370/252 |
| 2012/0027005 A1 | 2/2012 | Haustein et al. |
| 2012/0071106 A1* | 3/2012 | Kadous ................ H04W 52/38 |
| | | 455/67.11 |
| 2013/0034129 A1 | 2/2013 | Coldrey et al. |
| 2013/0207839 A1 | 8/2013 | Simic et al. |
| 2013/0242860 A1 | 9/2013 | Kim et al. |
| 2014/0016549 A1 | 1/2014 | Novlan et al. |
| 2014/0170963 A1 | 6/2014 | Delaveau et al. |
| 2018/0287739 A1* | 10/2018 | Kim ....................... H04B 1/525 |
| 2018/0375689 A1* | 12/2018 | Yu ...................... H04L 25/0204 |

\* cited by examiner

US 10,574,276 B2

SELECTING A PRECODING CONFIGURATION BASED ON SELF-JAMMING METRICS

TECHNICAL FIELD

The present disclosure relates generally to communication systems. More specifically, the present disclosure relates to systems and methods for selecting a precoding configuration based on self-jamming metrics.

BACKGROUND

Wireless communication systems are widely deployed to provide various types of communication content such as voice, video, data and so on. These systems may be multiple-access systems capable of supporting simultaneous communication of multiple wireless communication devices with one or more base stations.

Wireless networking systems have become a prevalent means by which a large number of people worldwide communicate. Wireless communication devices have become smaller and more powerful to meet consumer needs, which include improved portability and convenience. Users have found many uses for wireless communication devices, such as cellular telephones, personal digital assistants (PDAs) and the like, and demand reliable service and expanded coverage areas.

Wireless communication devices are increasingly designed to include multiple radios within a single device. These multiple radios may create self-interference from the transmissions of one radio (carrier) to the reception of another radio (carrier) within the device.

Performance for a wireless communication system may be enhanced by using precoding within a region to communicate between a base station or access point and the mobile device(s). However, precoding may also be selected to account for self-interference within a wireless communication device.

SUMMARY

A method for wireless communication by a wireless communication device is described. It is determined that an aggressor radio in the wireless communication device can cause self-jamming to a victim radio in the wireless communication device. A precoding configuration is selected based on one or more link throughput metrics and one or more self-jamming metrics. The precoding configuration is applied to transmissions of the aggressor radio.

Determining that the aggressor radio can cause self-jamming may include analyzing frequency bands occupied by the aggressor radio and the victim radio. In one configuration, determining that the aggressor radio can cause self-jamming may include measuring interference levels on a victim radio. Determining that the aggressor radio can cause self-jamming may also include measuring interference levels on the aggressor radio. In one configuration, determining that the aggressor radio can cause self-jamming may include receiving an indication of the self-jamming from a base station.

The precoding configuration may be selected by considering both maximizing the uplink throughput of the aggressor radio and minimizing self-jamming to the victim radio. In one configuration, the precoding configuration may be selected to minimize self-jamming to the victim radio at the expense of uplink throughput of the aggressor radio. In another configuration, the precoding configuration may be selected to maximize uplink throughput of the aggressor radio at the expense of self-jamming to the victim radio.

Selecting a precoding configuration may result in a recommended precoding configuration. The recommended precoding configuration may be sent to a network. A selected precoding configuration may be received from the network. The selected precoding configuration may be applied to transmissions of the aggressor radio.

Selecting a precoding configuration may also result in a set of recommended precoding configurations. The set of recommended precoding configurations may be sent to a network. A selected precoding configuration may be received from the network. The selected precoding configuration may be applied to transmissions of the aggressor radio.

The aggressor radio and the victim radio may be part of a single radio. The self-jamming may be due to multiple aggressor radios. A precoding configuration may be selected for each of the multiple aggressor radios. The self-jamming may affect multiple victim radios. Only self-jamming experienced by active victim receivers may be considered when selecting the precoding configuration.

A wireless communication device configured for wireless communication is also described. The wireless communication device includes a processor, memory in electronic communication with the processor and instructions stored in the memory. The instructions are executable by the processor to determine that an aggressor radio in the wireless communication device can cause self-jamming to a victim radio in the wireless communication device. The instructions are also executable by the processor to select a precoding configuration based on one or more link throughput metrics and one or more self-jamming metrics. The instructions are further executable by the processor to apply the precoding configuration to transmissions of the aggressor radio.

An apparatus for wireless communications is described. The apparatus includes means for determining that an aggressor radio in the apparatus can cause self-jamming to a victim radio in the apparatus. The apparatus also includes means for selecting a precoding configuration based on one or more link throughput metrics and one or more self-jamming metrics. The apparatus further includes means for applying the precoding configuration to transmissions of the aggressor radio.

A computer-program product for selecting a precoding configuration is also described. The computer-program product includes a non-transitory computer-readable medium having instructions thereon. The instructions include code for causing a wireless communication device to determine that an aggressor radio in the wireless communication device can cause self-jamming to a victim radio in the wireless communication device. The instructions also include code for causing the wireless communication device to select a precoding configuration based on one or more link throughput metrics and one or more self-jamming metrics. The instructions further include code for causing the wireless communication device to apply the precoding configuration to transmissions of the aggressor radio.

DETAILED DESCRIPTION

Figure 1:
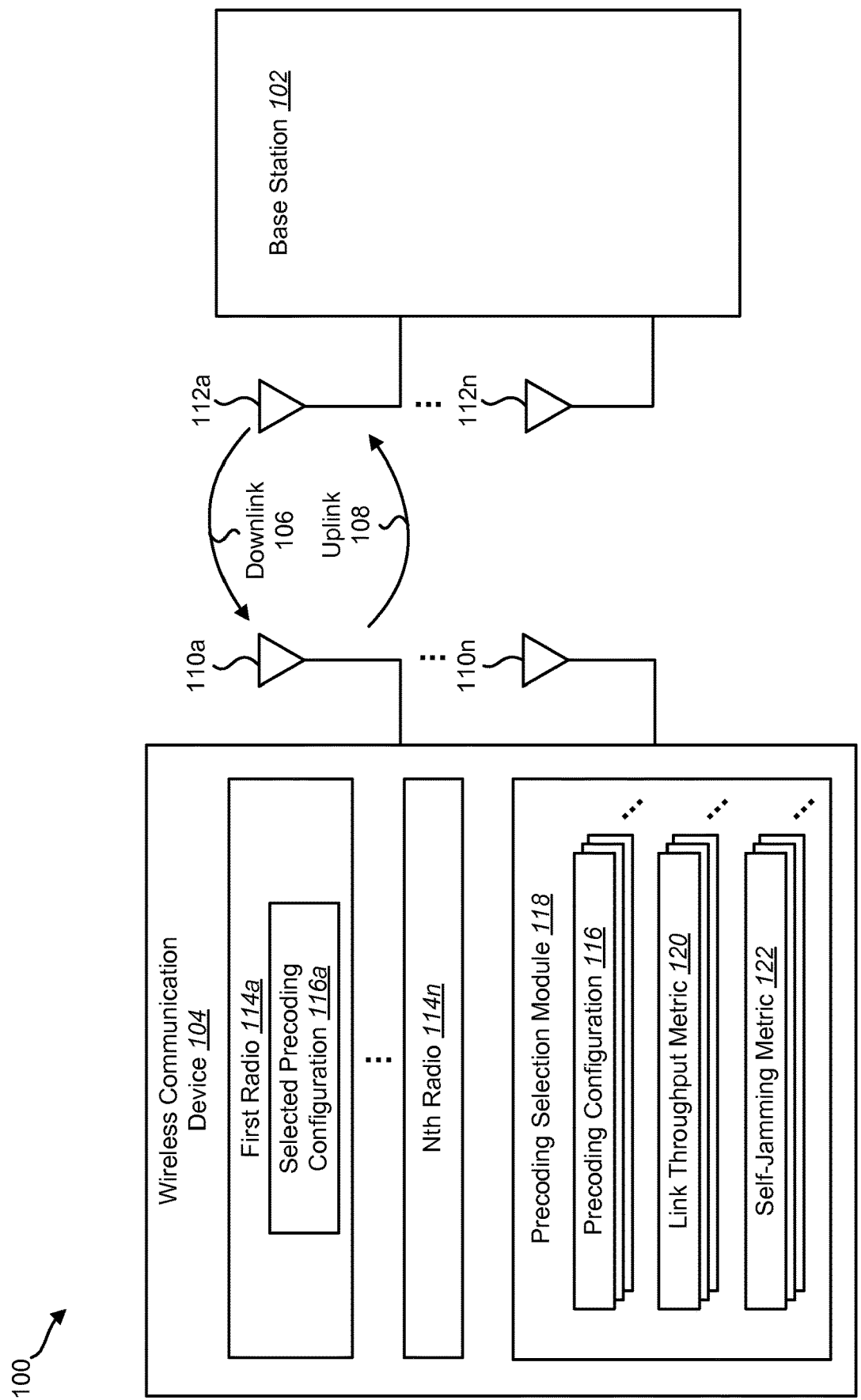
FIG. 1 shows a wireless communication system with multiple wireless devices.

FIG. 1 shows a wireless communication system 100 with multiple wireless devices. A wireless device may be a base station 102, a wireless communication device 104, or the like. The wireless communication device 104 may be configured with advanced precoding. For example, the wireless communication device may be configured to select a precoding configuration 116 that will minimize self-jamming.

A wireless communication device 104 may also be referred to as, and may include some or all of the functionality of, a terminal, an access terminal, a user equipment (UE), a mobile device, a subscriber unit, a station, etc. A wireless communication device 104 may be a cellular phone, a personal digital assistant (PDA), a wireless device, a wireless modem, a handheld device, a laptop computer, etc. A wireless communication device 104 may communicate with zero, one, or multiple base stations 102 on the downlink 106 and/or uplink 108 at any given moment using an antenna 110. The downlink 106 (or forward link) refers to the communication link from a base station 102 to the wireless communication device 104, and the uplink 108 (or reverse link) refers to the communication link from the wireless communication device 104 to the base station 102.

A base station 102 is a station that communicates with one or more wireless communication devices 104. A base station 102 may also be referred to as, and may include some or all of the functionality of, an access point, a broadcast transmitter, a Node B, an evolved Node B, etc. Each base station 102 provides communication coverage for a particular geographic area. The term "cell" can refer to a base station 102 and/or its coverage area depending on the context in which the term is used. The base station 102 may include multiple antennas 112a-n for transmitting and receiving wireless signals.

Communications in a wireless communication system 100 (e.g., a multiple-access system) may be achieved through transmissions over a wireless link. Such a communication link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system 100 may utilize MIMO. A MIMO system may support both time division duplex (TDD) and frequency division duplex (FDD) systems. In a TDD system, uplink 108 and downlink 106 transmissions are in the same frequency region so that the reciprocity principle allows the estimation of the downlink 106 channel from the uplink 108 channel. This enables a transmitting wireless device to extract transmit beamforming gain from communications received by the transmitting wireless device.

The wireless communication system 100 may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA and GSM are part of Universal Mobile Telecommunication System (UMTS). Long Term Evolution (LTE) is a release of UMTS that uses E-UTRA. UTRA, E-UTRA, GSM, UMTS and Long Term Evolution (LTE) are described in documents from an organization named "3rd Generation Partnership Project" (3GPP). cdma2000 is described in documents from an organization named "3rd Generation Partnership Project 2" (3GPP2).

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices. In 3GPP Long Term Evolution (LTE), a wireless communication device 104 may be referred to as a "user equipment" (UE).

The wireless communication device 104 may include multiple radios 114a-n. In the example shown, the wireless communication device includes a first radio 114a and additional radios 114 up to an nth radio 114n. Each radio 114 may be used for wireless communications by the wireless communication device 104. For example, one radio 114 may be used for Bluetooth communications while another radio is used for LTE communications. In some configurations, multiple radios 114 may be used for one type of technology communications. For example, one radio may be used for the primary component carrier while another radio is used for the secondary component carrier in LTE-Advanced networks supporting carrier aggregation. A wireless communication device 104 may include a wide area network (WAN) radio 114, a wireless local area network (WLAN) radio 114, a GPS radio 114, a Bluetooth radio 114, a carrier aggregation radio 114, etc. Each radio 114 may transmit and/or receive using one or more antennas 110a-n on the wireless communication device 104.

Each radio 114 may include a selected precoding configuration 116a. In general, precoding refers to the use of beamforming to support multi-stream or multi-layer transmissions in multi-antenna wireless communications. Traditionally, a precoding configuration 116 choice is based on the metrics for a given channel. For example, the precoding configuration 116 for transmissions by an LTE radio 114 on the wireless communication device 104 may be selected to maximize the LTE uplink 108 throughput based on the LTE uplink 108 channel.

However, self-jamming may also be an important consideration for selecting a precoding configuration 116. Self-jamming refers to self-interference generated on a wireless communication device 104. Self-jamming may occur when the transmitter of one radio 114 causes interference for the receiver of another radio 114. Self-jamming may also occur within a single radio 114 from transmit signal leakage due to imperfect Tx/Rx isolation. Although different radios 114 may use different frequency bands, the jamming may occur due to various non-linear distortion generated by analog components. Such non-linear mechanisms include, for example, harmonics, inter-modulation distortion, and adjacent channel leakage. Self-jamming may also be referred to as self-interference.

The wireless communication device 104 may include a precoding selection module 118. The precoding selection module 118 may allow the wireless communication device 104 to evaluate multiple precoding configurations 116b and determine a best suited precoding configuration 116 for the needs of the wireless communication device 104. Traditionally, the precoding configuration 116 has been selected based on one or more link throughput metrics 120. For example, a precoding configuration 116 for transmissions by the first radio 114a may be selected based on a link throughput metric 120 for the first radio 114a that maximizes the uplink 108 throughput of the first radio 114a. However, a precoding configuration 116 that maximizes the uplink 108 throughput may not be the best choice for minimizing the self-interference.

Instead, the precoding selection module 118 may include one or more self-jamming metrics 122. For example, a self-jamming metric 122 may indicate the self-jamming relationship between the first radio 114a and an nth radio 114n. As another example, the self-jamming metric 122 may indicate the self-jamming relationship between the transmitter and receiver of the first radio 114a. By considering both the link throughput metrics 120 and the self-jamming metrics 122, the precoding selection module 118 may select an optimal precoding configuration 116 for the present circumstances. As an example, the wireless communication device 104 may want to select a precoding configuration 116 that minimizes the self-interference while sacrificing the uplink 108 throughput for a given radio 114. Once a precoding configuration 116 has been selected for a particular radio 114, the radio 114 may then use the selected precoding configuration 116 for transmissions.

Figure 2:
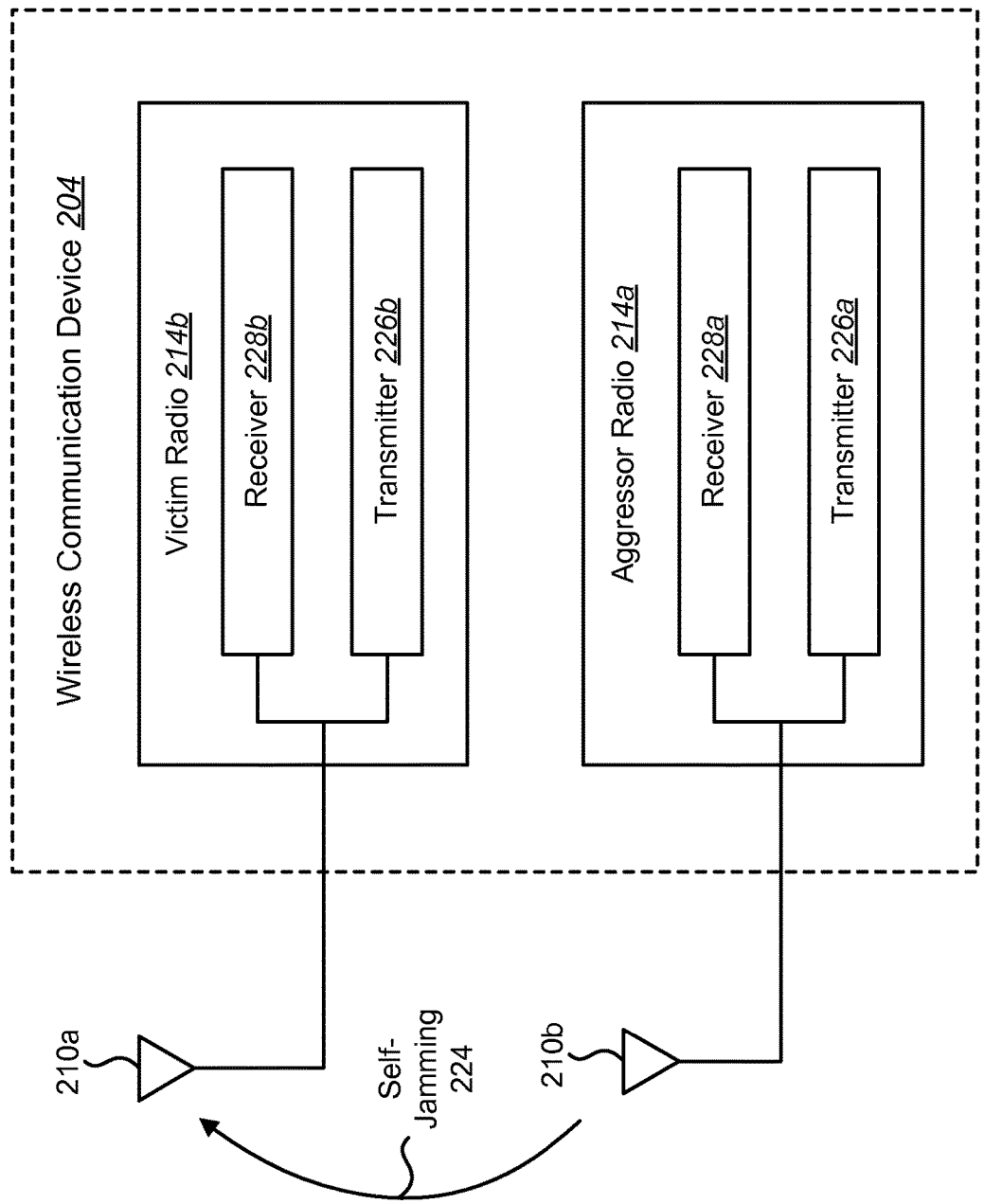
FIG. 2 illustrates self-jamming between an aggressor radio and a victim radio on a wireless communication device.

FIG. 2 illustrates self-jamming 224 between an aggressor radio 214a and a victim radio 214b on a wireless communication device 204. The wireless communication device 204 of FIG. 2 may be one configuration of the wireless communication device 104 of FIG. 1. The wireless communication device 204 may include an aggressor radio 214a and a victim radio 214b. The aggressor radio 214a may include a transmitter 226a and a receiver 228a. The victim radio 214b may also include a transmitter 226b and a receiver 228b.

The aggressor radio 214a may be causing self-interference on the wireless communication device 204. In the example illustrated, the aggressor radio 214a is causing self-jamming 224 for the victim radio 214b. In other words, transmissions from the aggressor radio 214a are interfering with receiving operations of the victim radio 214b. In another configuration (not shown), the aggressor radio 214a may cause self-jamming 224 for the receiver 228a on the aggressor radio 214a. The victim radio 214b may use a first antenna 210a and the aggressor radio 214a may be a second antenna 210b.

Only the interference to active victim radios 214b may need to be considered (e.g., interference to inactive victim radios 214b may not be relevant). The use of advanced precoding selection may be used together with active interference cancellation (e.g., non-linear interference cancellation (NLIC)). For example, some of the interference may be minimized by precoding and the remaining interference may be canceled by NLIC. As another example, for a rank 2 transmission, a precoding configuration 116 may be selected such that one layer doesn't cause a net interference and the other layer causes interference that is subsequently canceled by NLIC.

Figure 3:
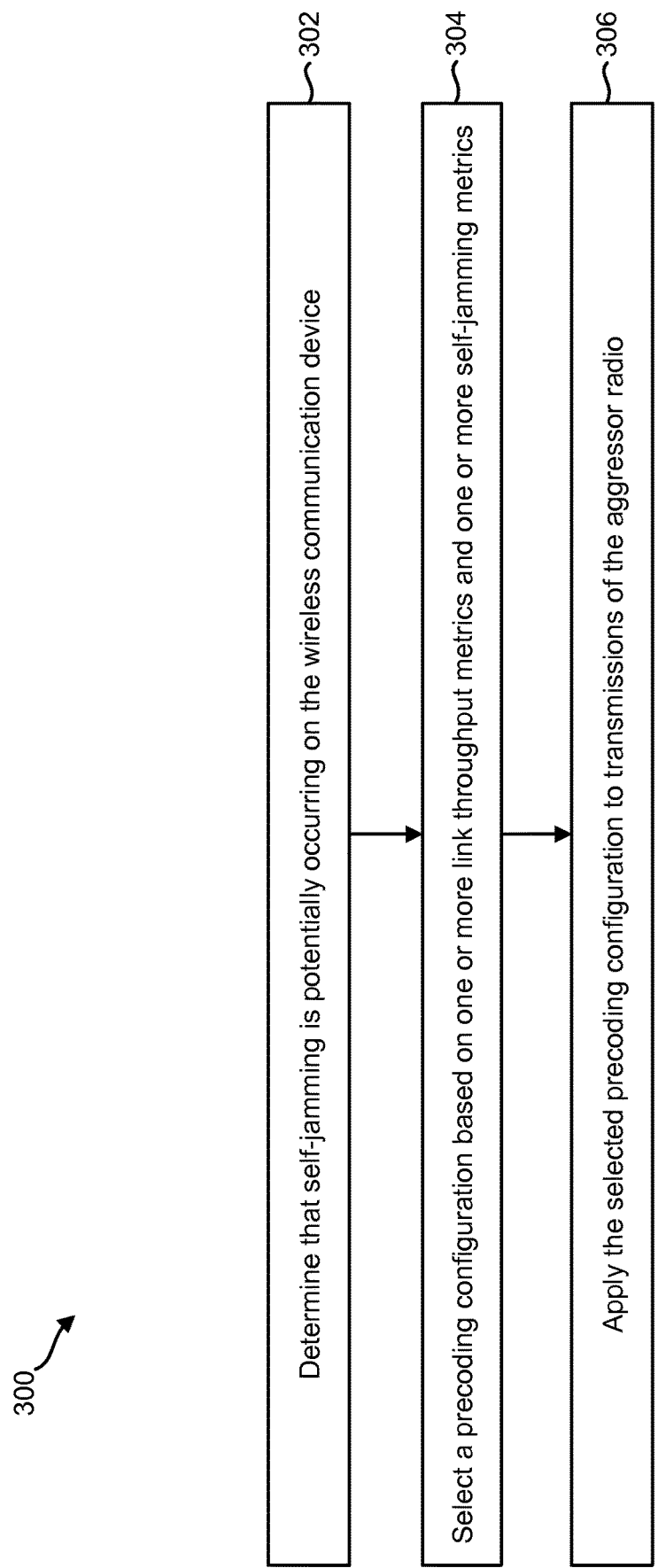
FIG. 3 is a flow diagram of a method for selecting a precoding configuration.

FIG. 3 is a flow diagram of a method 300 for selecting a precoding configuration 116. The method 300 may be performed by a wireless communication device 104. The wireless communication device 104 may include a precoding selection module 118. More specifically, the wireless communication device 104 may be configured with advanced precoding selection to minimize self-jamming 224.

The wireless communication device 104 may determine 302 that self-jamming 224 is potentially occurring on the wireless communication device 104. For example, the wireless communication device 104 may determine that an aggressor radio 214a on the wireless communication device 104 will potentially interfere with one or more radios 114 on the wireless communication device 104. In one configuration, the aggressor radio 214a may potentially interfere with a receiver 228a on the aggressor radio 214a (e.g., due to Tx leakage from imperfect Tx/Rx isolation). In another configuration, the aggressor radio 214a may potentially interfere with a receiver 228b on a victim radio 214b.

The wireless communication device 104 may determine 302 that self-jamming 224 is occurring (or may potentially occur) on the wireless communication device 104 in many different ways. For example, the wireless communication device 104 may figure out and tabulate the self-jamming relationship among different radios and different frequency bands based on prior knowledge or by analyzing the frequency bands occupied by the aggressor radio 214a and the victim radio 214b. Specifically, if the downlink 106 of the victim radio operates on a frequency band whose center frequency is three times that of the center frequency of the band that the aggressor transmitter is operating on, the victim receiver 228b may be subject to self-jamming arising from the $3^{rd}$ order harmonics of the aggressor transmitted signal.

As another example, the wireless communication device 104 may receive an internal indication from the victim receiver 228b that self-interference is occurring. As another example, the wireless communication device 104 may receive a notification from the base station 102 that self-interference is likely occurring. In yet another example, the wireless communication device 104 may periodically measure interference levels on the aggressor radio 214a and/or the victim radio 214b.

The wireless communication device 104 may select 304 a precoding configuration 116 based on one or more link throughput metrics 120 and one or more self-jamming metrics 122. For example, the wireless communication device 104 may select 304 a precoding configuration 116 for transmissions by the aggressor radio 214a based on link throughput metrics 120 for the aggressor radio 214a and a victim radio 214b and based on self-jamming metrics 122 for the aggressor radio 214a and the victim radio 214b. In one configuration, the wireless communication device 104 may select 304 a precoding configuration 116 for transmissions by the aggressor radio 214a that minimizes the self-jamming 224 rather than a precoding configuration 116 that maximizes uplink 108 throughput for the aggressor radio 214a. The wireless communication device 104 may apply 306 the selected precoding configuration 116 to transmissions of the aggressor radio 214a.

Figure 4:
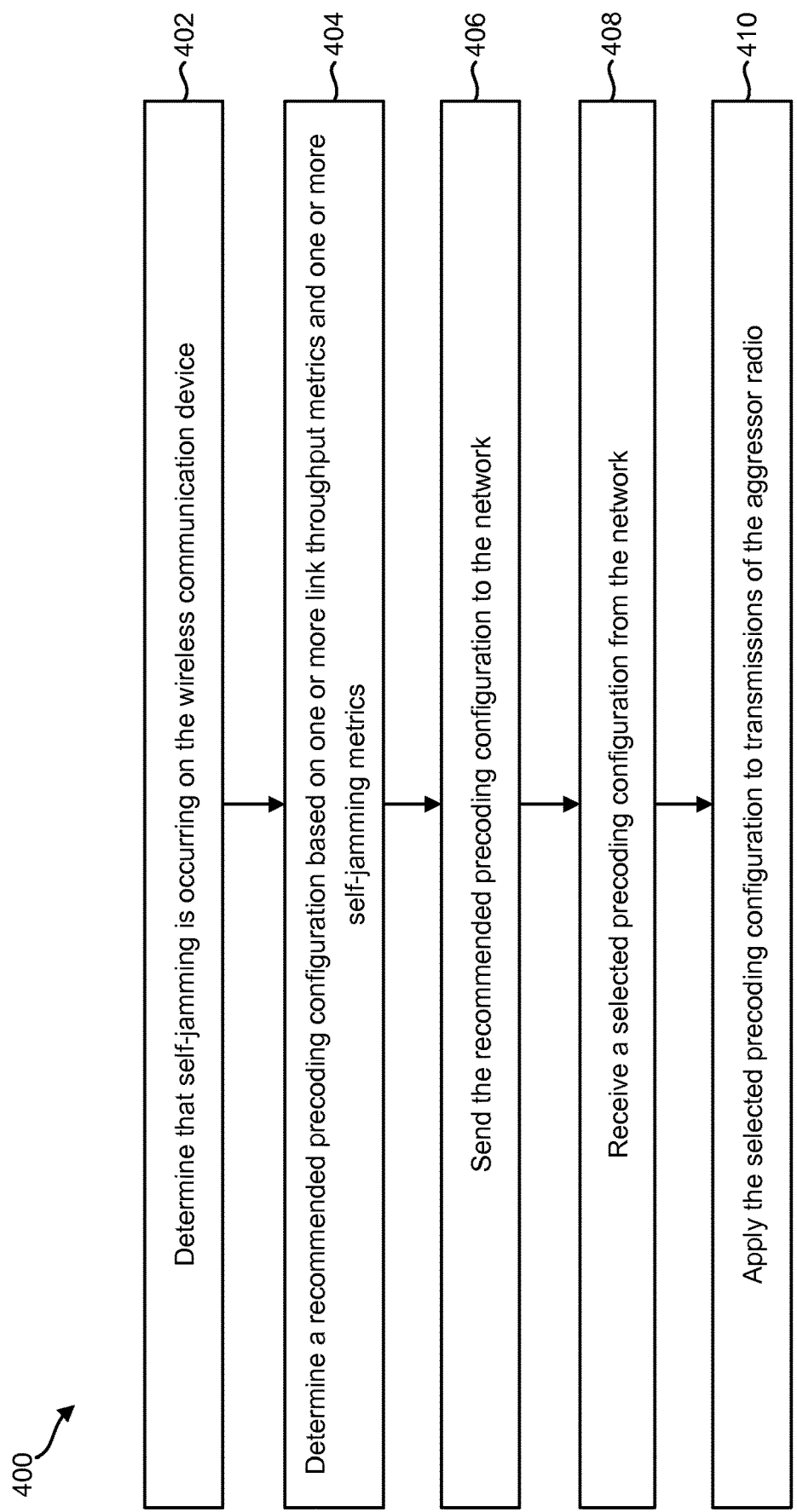
FIG. 4 is a flow diagram of another method for selecting a precoding configuration.

FIG. 4 is a flow diagram of another method 400 for selecting a precoding configuration 116. The method 400 may be performed by a wireless communication device 104. In one configuration, the wireless communication device 104 may be configured for advanced precoding configuration 116 selection. The wireless communication device 104 may be configured for operation using Long Term Evolution (LTE). The wireless communication device 104 may determine 402 that self-jamming 224 is occurring (or may potentially occur) due to an aggressor radio 214a. As discussed above, the wireless communication device 104 may determine 402 that self-jamming 224 may occur due to a known frequency relationship, or that self-jamming 224 is occurring by performing measurements on the aggressor radio 214a, performing measurements on a victim radio 214b or by receiving data from a base station 102 indicating that self-jamming 224 is occurring.

The wireless communication device 104 may determine 404 a recommended precoding configuration 116 based on one or more link throughput metrics 120 and one or more self-jamming metrics 122. For example, the wireless communication device 104 may evaluate each potential precoding configuration 116 and select a precoding configuration 116 that matches the particular needs of the wireless communication device 104. In some configurations, the selected precoding configuration 116 may favor an aggressor radio 214a over a victim radio 214b (i.e., the selected precoding configuration 116 provides a bias of increased uplink 108 throughput of the aggressor radio 214a over self-interference reduction to the victim radio 214b). In other configurations, the selected precoding configuration 116 may favor a victim radio 214b over an aggressor radio 214a (i.e., the selected precoding configuration 116 provides a bias of self-interference reduction to the victim radio 214b over an increase in uplink 108 throughput for the aggressor radio 214a).

The wireless communication device 104 may not have the freedom to select a precoding configuration 116 to be used. For example, in LTE networks, it is the eNB that determines which precoding is used by the wireless communication device 104 for uplink 108 transmissions. In one example, the wireless communication device 104 may send 406 the recommended precoding configuration 116 to the network. In another example, the wireless communication device 104 may send a set of recommended precoding configurations to the network, and the network may select one of them. The wireless communication device 104 may then receive 408 a selected precoding configuration 116 from the network. The wireless communication device 104 may apply 410 the selected precoding configuration 116 to transmissions of the aggressor radio 214a.

Figure 5:
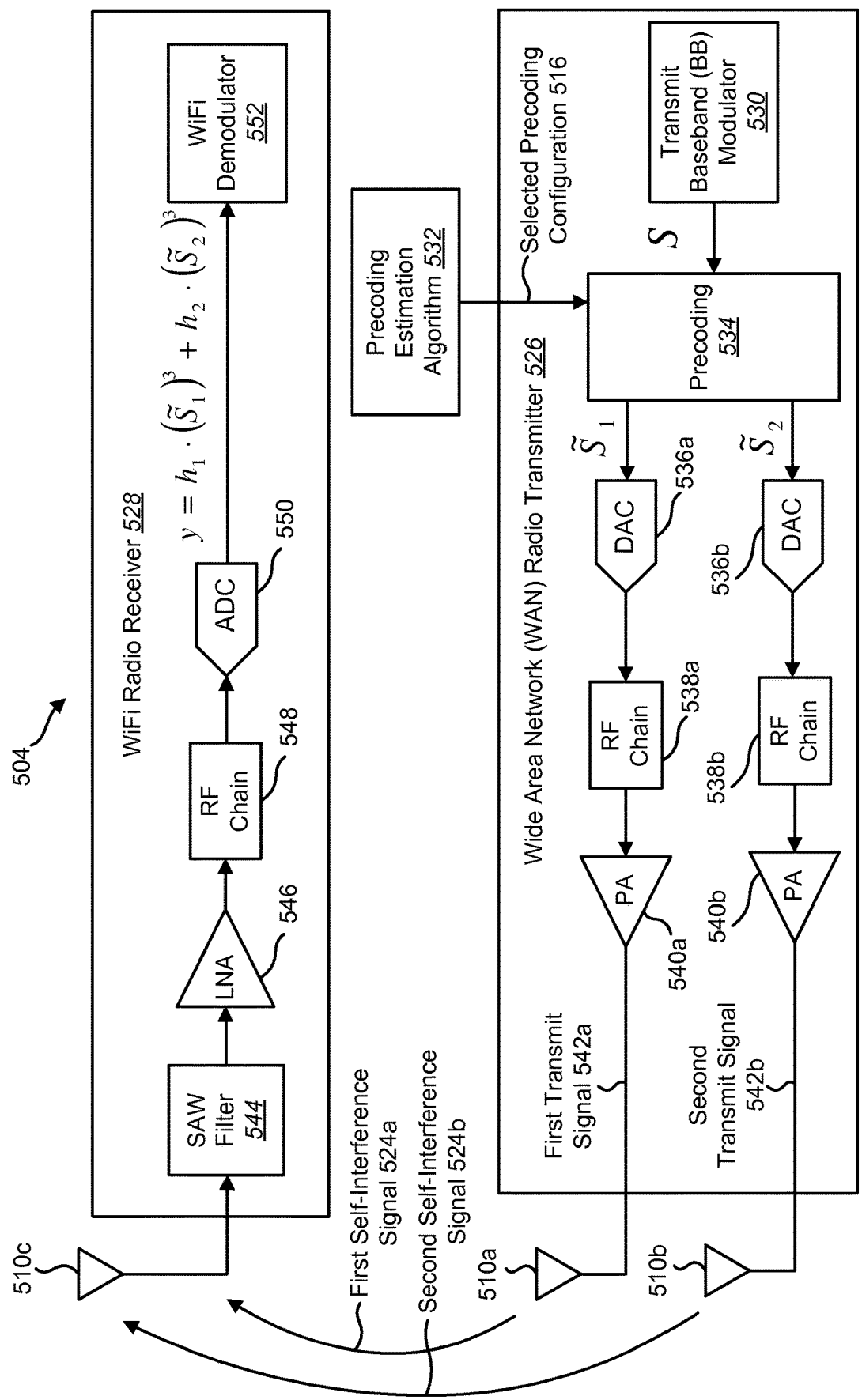
FIG. 5 is a block diagram illustrating self-interference within a wireless communication device.

FIG. 5 is a block diagram illustrating self-interference within a wireless communication device 504. The wireless communication device 504 may include a wide area network (WAN) radio transmitter 526 that is operating as an aggressor radio 214a and a WiFi radio receiver 528 that is operating as a victim radio 214b.

The wide area network (WAN) radio transmitter 526 may include two antennas 510a-b for LTE transmissions. A transmit baseband (BB) modulator 530 on the wide area network (WAN) radio transmitter 526 may provide a signal S to a precoding module 534. The precoding module 534 may apply a selected precoding configuration 516 (determined using a precoding estimation algorithm 532) to the signal S. The precoding module 534 may output a first signal $\tilde{S}_1$ for transmission by the first antenna 510a and a signal $\tilde{S}_2$ for transmission by the second antenna 510b. The first signal $\tilde{S}_1$ may be passed through a digital-to-analog converter (DAC) 536a, an RF chain 538a and a power amplifier (PA) 540a to obtain a first transmit signal 542a that is transmitted by the first antenna 510a. Likewise, the second signal $\tilde{S}_2$ may be passed through a DAC 536b, an RF chain 538b and a power amplifier (PA) 540b to obtain a second transmit signal 542b that is transmitted by the second antenna 510b.

The WiFi radio receiver 528 may be coupled to a third antenna 510c. The third antenna 510c may be used by the WiFi radio receiver 528 to receive WiFi signals. However, the third antenna 510c may also receive a first self-interference signal 524a from the first antenna 510a and a second self-interference signal 524b from the second antenna 510b. The self-interference signals 524 may be caused by non-linear and linear distortion, which has a known (or measurable through estimation) relationship.

The WiFi radio receiver 528 may pass received signals through a surface acoustic wave (SAW) filter 544 and a low noise amplifier (LNA) 546 before providing the signals to an RF chain 548. The output of the RF chain 548 may be coupled to an analog-to-digital converter (ADC) 550. Assuming third order harmonic distortion (for illustration purposes), the analog-to-digital converter (ADC) 550 may output a signal $y=h_1(\tilde{S}_1)^3+h_2(\tilde{S}_2)^3$ to a WiFi demodulator 552.

For simplicity of illustration, it may be assumed that the first self-interference signal 524a and the second self-interference signal 524b are identical. An optimal precoding configuration 116 for the wide area network (WAN) radio transmitter 526 (to improve the self-jamming operation of the WiFi radio receiver 528) may be [1, −1], since this will cause the first self-interference signal 524a and the second self-interference signal 524b to cancel each other out (leaving no net interference).

In general, the precoding configuration 116 for an uplink 108 transmission by radio n 114 can be described using Equation (1):

$$W_n^{opt} = \underset{W}{\arg\min} f(R_n(W), I_1(W), \ldots , I_N(W)). \qquad (1)$$

In Equation (1), n is the radio index (1≤n≤N) that the selected precoding configuration 116 is applied to (i.e., the aggressor radio 214a) and N refers to the total number of radios 114 in the wireless communication device 504. Also, in Equation (1), $W_n^{opt}$ refers to the desired precoding matrix (or precoding vector) and $R_n$ is a metric representing the performance of the radio n when the precoding configuration W 116 is applied (i.e., a link throughput metric 120 for an aggressor radio 214a). Further, in Equation (1), $I_m$ refers to a metric representing the impact of interference to the $m^{th}$ radio (i.e., a self-jamming metric 122 for the victim radio 214b) and f( ) is a metric (or cost function) combining the overall impact on the performance of the aggressor radio 214a and the interference experienced by the victim radios 214b.

The formula of Equation (1) can be generalized to any number of simultaneous transmissions and precoding configuration 116 selections, as described in Equation (2):

$$\{W_{n_1}^{opt}, W_{n_2}^{opt}\} = \underset{W_1, W_2}{\operatorname{argmin}} f(R_{n_1}(W_1), R_{n_2}(W_2), I_1(W_1, W_2), \ldots, I_N(W_1, W_2)). \quad (2)$$

In Equation (2), $n_1$ and $n_2$ are the radio indices ($1 \le n_1 \le N$, $1 \le n_2 \le N$) that the precoding configurations 116 are applied to (i.e., the aggressor radios 214a). $W_{n_1}^{opt}$ is the desired precoding matrix (or vector) for the radio $n_1$ and $W_{n_2}^{opt}$ is the $n_1$ $n_2$ desired precoding matrix (or vector) for the radio $n_2$. $R_{n_1}$ is a metric representing the performance of the radio $n_1$ when the precoding configuration $W_1$ is applied. $R_{n_2}$ is a metric representing the performance of the radio $n_2$ when the precoding configuration $W_2$ is applied. $I_m$ refers to a metric representing the impact of interference to the $m^{th}$ radio (i.e., the victim radio 214b) and f ( ) is a metric (or cost function) combining the overall impact on the performance of the aggressor radio 214a and the interference experienced by the victim radios 214b.

Figure 6:
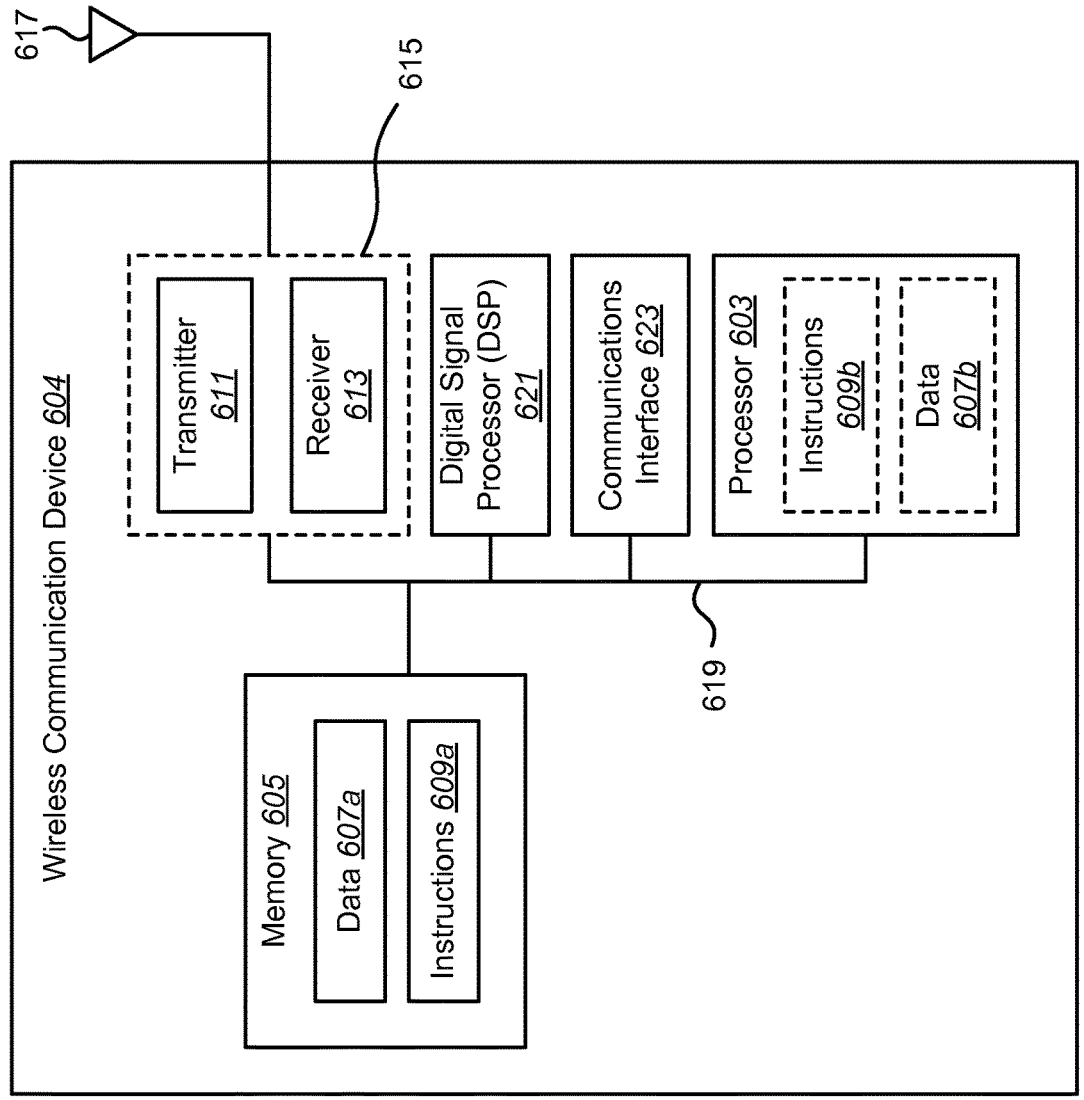
FIG. 6 illustrates certain components that may be included within a wireless communication device that is configured in accordance with the present disclosure.

FIG. 6 illustrates certain components that may be included within a wireless communication device 604. The wireless communication device 604 may implement the present systems and methods as disclosed herein.

The wireless communication device 604 includes a processor 603. The processor 603 may be a general purpose single- or multi-chip microprocessor (e.g., an ARM), a special purpose microprocessor (e.g., a digital signal processor (DSP) 621), a microcontroller, a programmable gate array, etc. The processor 603 may be referred to as a central processing unit (CPU). Although just a single processor 603 is shown in the wireless communication device 604 of FIG. 6, in an alternative configuration, a combination of processors (e.g., an ARM and DSP 621) could be used.

The wireless communication device 604 also includes memory 605. The memory 605 may be any electronic component capable of storing electronic information. The memory 605 may be embodied as random access memory (RAM), read only memory (ROM), magnetic disk storage media, optical storage media, flash memory devices in RAM, on-board memory included with the processor, EPROM memory, EEPROM memory, registers and so forth, including combinations thereof.

Data 607a and instructions 609a may be stored in the memory 605. The instructions 609a may be executable by the processor 603a to implement the methods disclosed herein. Executing the instructions 609a may involve the use of the data 607a that is stored in the memory 605. When the processor 603 executes the instructions 609a, various portions of the instructions 609b may be loaded onto the processor 603, and various pieces of data 607b may be loaded onto the processor 603.

The wireless communication device 604 may also include a transmitter 611 and a receiver 613 to allow transmission and reception of signals to and from the wireless communication device 604. The transmitter 611 and receiver 613 may be collectively referred to as a transceiver 615. An antenna 617 may be electrically coupled to the transceiver 615. The wireless communication device 604 may also include multiple transmitters, multiple receivers, multiple transceivers and/or multiple antennas (not shown).

The various components of the wireless communication device 604 may be coupled together by one or more buses, which may include a power bus, a control signal bus, a status signal bus, a data bus, etc. For the sake of clarity, the various buses are illustrated in FIG. 6 as a bus system 619.

The wireless communication device 604 may include a digital signal processor (DSP) 621. The wireless communication device 604 may also include a communications interface 623. The communications interface 623 may allow a user to interact with the wireless communication device 604.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, include compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for wireless communication by a wireless communication device, comprising:
    determining that an aggressor radio in the wireless communication device can cause self-jamming to a victim radio in the wireless communication device;
    selecting a precoding configuration comprising a precoding matrix for the aggressor radio for beamforming to support multi-stream or multi-layer transmissions in multi-antenna wireless communications, wherein the precoding matrix is determined based at least on a cost function that combines one or more link throughput metrics and one or more self-jamming metrics, wherein the precoding matrix determined by the cost function minimizes an impact on aggressor radio performance and interference experienced by the victim radio; and
    applying the precoding configuration to transmissions of the aggressor radio.

2. The method of claim 1, wherein determining that the aggressor radio can cause self-jamming comprises analyzing frequency bands occupied by the aggressor radio and the victim radio.

3. The method of claim 1, wherein determining that the aggressor radio can cause self-jamming comprises measuring interference levels on a victim radio.

4. The method of claim 1, wherein determining that the aggressor radio can cause self-jamming comprises measuring interference levels on the aggressor radio.

5. The method of claim 1, wherein determining that the aggressor radio can cause self-jamming comprises receiving an indication of the self-jamming from a base station.

6. The method of claim 1, wherein the precoding configuration is selected by considering both maximizing uplink throughput of the aggressor radio and minimizing self-jamming to the victim radio.

7. The method of claim 1, wherein the precoding configuration is selected to minimize self-jamming to the victim radio at the expense of uplink throughput of the aggressor radio.

8. The method of claim 1, wherein the precoding configuration is selected to maximize uplink throughput of the aggressor radio at the expense of self-jamming to the victim radio.

9. The method of claim 1, wherein selecting a precoding configuration results in a recommended precoding configuration, and further comprising:
    sending the recommended precoding configuration to a network; and
    receiving a selected precoding configuration from the network, wherein the selected precoding configuration is applied to transmissions of the aggressor radio.

10. The method of claim 1, wherein selecting a precoding configuration results in a set of recommended precoding configurations, and further comprising:
    sending the set of recommended precoding configurations to a network; and
    receiving a selected precoding configuration from the network, wherein the selected precoding configuration is applied to transmissions of the aggressor radio.

11. The method of claim 1, wherein the aggressor radio and the victim radio are part of a single radio.

12. The method of claim 1, wherein the self-jamming is due to multiple aggressor radios.

13. The method of claim 12, wherein a precoding configuration is selected for each of the multiple aggressor radios.

14. The method of claim 1, wherein the self-jamming affects multiple victim radios.

15. The method of claim 1, wherein only self-jamming experienced by active victim receivers is considered when selecting the precoding configuration.

16. A wireless communication device configured for wireless communication, comprising:
    a processor;
    memory in electronic communication with the processor; and
    instructions stored in the memory, the instructions being executable by the processor to:
    determine that an aggressor radio in the wireless communication device can cause self-jamming to a victim radio in the wireless communication device;
    select a precoding configuration comprising a precoding matrix for the aggressor radio for beamforming to support multi-stream or multi-layer transmissions in multi-antenna wireless communications, wherein the precoding matrix is determined based at least on a cost function that combines one or more link throughput metrics and one or more self-jamming metrics, wherein the precoding matrix determined by the cost function minimizes an impact on aggressor radio performance and interference experienced by the victim radio; and
    apply the precoding configuration to transmissions of the aggressor radio.

17. The wireless communication device of claim 16, wherein the instructions are executable by the processor to analyze frequency bands occupied by the aggressor radio and the victim radio.

18. The wireless communication device of claim 16, wherein the instructions are executable by the processor to measure interference levels on a victim radio.

19. The wireless communication device of claim 16, wherein the instructions are executable by the processor to measure interference levels on the aggressor radio.

20. The wireless communication device of claim 16, wherein the instructions are executable by the processor to receive an indication of the self-jamming from a base station.

21. The wireless communication device of claim 16, wherein the precoding configuration is selected by considering both maximizing uplink throughput of the aggressor radio and minimizing self-jamming to the victim radio.

22. The wireless communication device of claim 16, wherein the precoding configuration is selected to minimize self-jamming to the victim radio at the expense of uplink throughput of the aggressor radio.

23. The wireless communication device of claim 16, wherein the precoding configuration is selected to maximize uplink throughput of the aggressor radio at the expense of self-jamming to the victim radio.

24. The wireless communication device of claim 16, wherein the instructions are executable by the processor to:
select a precoding configuration that results in a recommended precoding configuration;
send the recommended precoding configuration to a network; and
receive a selected precoding configuration from the network, wherein the selected precoding configuration is applied to transmissions of the aggressor radio.

25. The wireless communication device of claim 16, wherein the instructions are executable by the processor to:
select a precoding configuration that results in a set of recommended precoding configurations;
send the set of recommended precoding configurations to a network; and
receive a selected precoding configuration from the network, wherein the selected precoding configuration is applied to transmissions of the aggressor radio.

26. The wireless communication device of claim 16, wherein the aggressor radio and the victim radio are part of a single radio.

27. The wireless communication device of claim 16, wherein the self-jamming is due to multiple aggressor radios.

28. The wireless communication device of claim 27, wherein a precoding configuration is selected for each of the multiple aggressor radios.

29. An apparatus for wireless communications, comprising:
means for determining that an aggressor radio in the apparatus can cause self-jamming to a victim radio in the apparatus;
means for selecting a precoding configuration comprising a precoding matrix for the aggressor radio for beamforming to support multi-stream or multi-layer transmissions in multi-antenna wireless communications, wherein the precoding matrix is determined based at least on a cost function that combines one or more link throughput metrics and one or more self-jamming metrics, wherein the precoding matrix determined by the cost function minimizes an impact on aggressor radio performance and interference experienced by the victim radio; and
means for applying the precoding configuration to transmissions of the aggressor radio.

30. A computer-program product for selecting a precoding configuration, the computer-program product comprising a non-transitory computer-readable medium having instructions thereon, the instructions comprising:
code for causing a wireless communication device to determine that an aggressor radio in the wireless communication device can cause self-jamming to a victim radio in the wireless communication device;
code for causing the wireless communication device to select a precoding configuration comprising a precoding matrix for the aggressor radio for beamforming to support multi-stream or multi-layer transmissions in multi-antenna wireless communications, wherein the precoding matrix is determined based at least on a cost function that combines one or more link throughput metrics and one or more self-jamming metrics, wherein the precoding matrix determined by the cost function minimizes an impact on aggressor radio performance and interference experienced by the victim radio; and
code for causing the wireless communication device to apply the precoding configuration to transmissions of the aggressor radio.

* * * * *